C. A. HEATH & R. B. MARTIN.
INSECT TRAP.
APPLICATION FILED APR. 11, 1908.
914,571.
Patented Mar. 9, 1909.
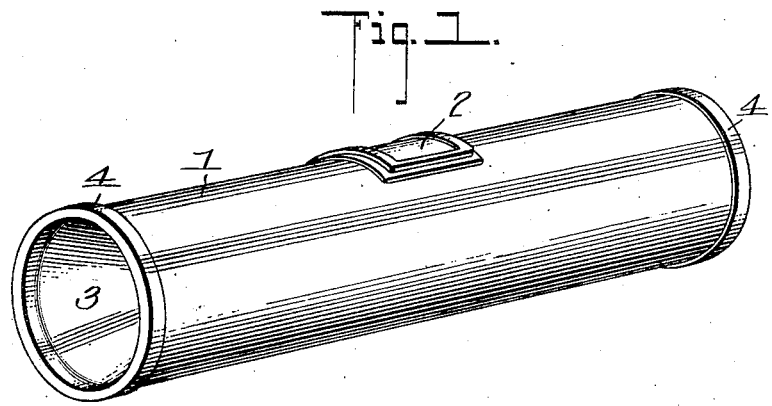
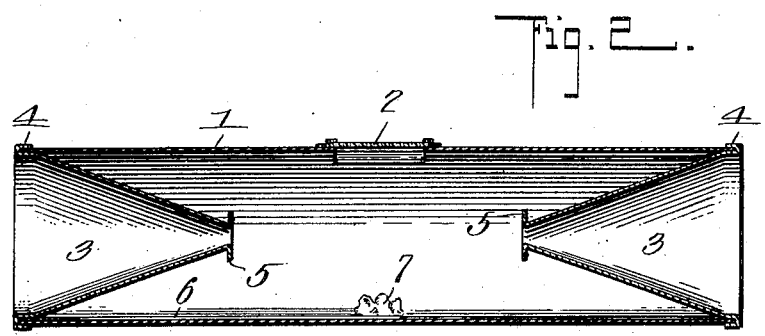
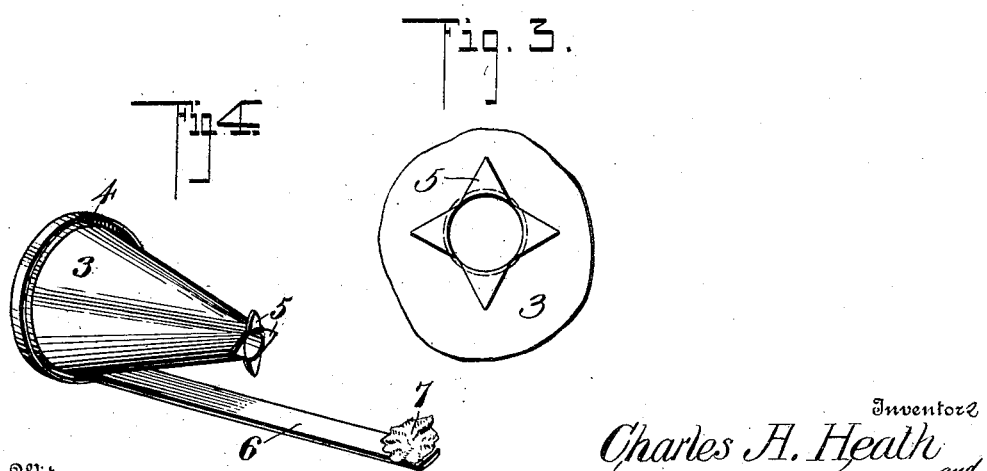
Inventors
Charles A. Heath and
Robert B. Martin

UNITED STATES PATENT OFFICE.

CHARLES A. HEATH AND ROBERT B. MARTIN, OF BROOKLYN, NEW YORK.

INSECT-TRAP.

No. 914,571.

Specification of Letters Patent.

Patented March 9, 1909.

Application filed April 11, 1908. Serial No. 426,503.

*To all whom it may concern:*

Be it known that we, CHARLES A. HEATH and ROBERT B. MARTIN, citizens of the United States, residing at Brooklyn, in the county of Kings and State of New York, have invented a new and useful Improvement in Insect-Traps, of which the following is a specification.

This invention relates to an insect trap and while especially designed for trapping the insect commonly known as the Croton water bug, is, of course, adapted for the trapping of many other kinds of insects which would be attracted by a suitable bait.

The invention consists in the novel features of construction hereinafter described, pointed out in the claim, and shown in the accompanying drawings, in which—

Figure 1 is a perspective view of our trap. Fig. 2 is a vertical longitudinal section through the trap. Fig. 3 is a detail end elevation of the inner end of one of the cones. Fig. 4 is a detail perspective view of a bait holder.

In these drawings 1 represents a cylinder open at each end and provided midway its length with a window 2 of glass or mica, and provided at each end with an inwardly extending cone 3. These cones are provided at their outer ends with annular flanges 4 bent back upon the cones fitting over the end portions of the cylinder, thus detachably holding the cones in position. The inner apex portion of each cone is split and turned back forming a series of spurs 5 which project outwardly from the cone at right angles to its axis. One of said cones is provided with a long inwardly extending tongue 6 which may be soldered or secured in any other way to the cone or if desired may be integral with it and upon the inner end portion of this tongue is placed any suitable bait 7, the said bait when the parts are in position resting immediately beneath the window or sight opening 2.

It will be obvious that the bait can be renewed at any time by simply drawing out the cone, carrying the tongue 6 and replenishing the bait. It will also be obvious that insects entering the cones and passing through the smaller ends into the cylinder 1 will under ordinary circumstances remain therein, or if any of them should crawl along the outer sides of the cones 3 they will be prevented from finding the exit opening by the projecting spurs 5. The natural habits of such insects, however, will cause them to be attracted either to the center of the cylinder where the bait is or into the narrow space at the ends of the cylinder between the side wall of said cylinder and the sides of the cones.

Having thus fully described our invention, what we claim as new and desire to secure by Letters Patent, is:—

An insect trap comprising a cylinder provided with a central side opening, inwardly extending flanged cones, carried by the cylinder ends, the flanges engaging the end portions of the cylinder, each cone having its apex portion split to form a series of radial spurs, and a bait-carrying tongue secured to the outer end of one of said cones and extending when in normal position parallel to the cylinder and to a point beneath the side opening.

CHARLES A. HEATH.
ROBERT B. MARTIN.

Witnesses:
LORISTON M. SWEET,
AUGUSTUS H. MERRITT.